United States Patent
Furuhashi et al.

(10) Patent No.: US 6,682,085 B2
(45) Date of Patent: Jan. 27, 2004

(54) STEP STRUCTURE FOR VEHICLES

(75) Inventors: Hitoshi Furuhashi, Saitama (JP); Shinichi Karube, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/207,029

(22) Filed: Jul. 30, 2002

(65) Prior Publication Data
US 2003/0025289 A1 Feb. 6, 2003

(30) Foreign Application Priority Data
Aug. 6, 2001 (JP) ........................................ 2001-237708

(51) Int. Cl.$^7$ ................................................ B60R 3/00
(52) U.S. Cl. ........................................ 280/163; 182/150
(58) Field of Search .................................. 280/163, 169, 280/164.1, 166, 291; 180/908, 292; 182/127, 150, 196

(56) References Cited

U.S. PATENT DOCUMENTS

| | | | | |
|---|---|---|---|---|
| 4,017,093 A | * | 4/1977 | Stecker, Sr. ............... | 280/163 |
| 5,064,016 A | * | 11/1991 | Iwai et al. ................ | 180/215 |
| D389,440 S | * | 1/1998 | Walters et al. ............ | D12/120 |
| 5,893,424 A | * | 4/1999 | Hisada ..................... | 180/90.6 |
| 6,113,121 A | * | 9/2000 | Mizuta ..................... | 280/163 |
| 6,116,630 A | * | 9/2000 | Thomas ..................... | 280/291 |
| 6,224,134 B1 | * | 5/2001 | Johnson et al. ............. | 296/75 |
| 6,270,106 B1 | * | 8/2001 | Maki et al. ................ | 280/291 |
| 6,296,163 B1 | * | 10/2001 | Kitao et al. ............... | 224/401 |
| 6,502,863 B1 | * | 1/2003 | Takahashi et al. .......... | 280/847 |

FOREIGN PATENT DOCUMENTS

| | | |
|---|---|---|
| JP | 11-11371 A | 1/1999 |
| JP | 11-165679 A | 6/1999 |

* cited by examiner

*Primary Examiner*—Brian L. Johnson
*Assistant Examiner*—Jeffrey J. Restifo
(74) *Attorney, Agent, or Firm*—Birch, Stewart, Kolasch & Birch, LLP (57) ABSTRACT

A step includes a support member extending from a vehicle frame. A first wire rod frame extends from the distal end of the support member to the vehicle frame. A second wire rod frame suspends the first frame from the vehicle frame. Furthermore, a foot board is disposed over the first frame and the support member. The step structure is of high flexibility. The step is capable of flexibly handling loads applied from the ground, and is prevented from being plastically deformed by loads applied from the ground. The first and second frames are made of wire rods. Accordingly, the step structure is made lightweight. As a consequence, the vehicle is made lightweight.

19 Claims, 8 Drawing Sheets

FIG. 8

STEP STRUCTURE FOR VEHICLES

CROSS-REFERENCE TO RELATED APPLICATIONS

This application claims priority under 35 U.S.C. §119 on Application No. 2001-237708, filed in Japan on Aug. 6, 2001, the entirety of which is hereby incorporated by reference.

BACKGROUND OF THE INVENTION

1. Field of the Invention

The present invention relates to a step structure in a vehicle. In particular, the present invention relates to a step structure in a vehicle having an engine mounted centrally in a vehicle frame, a saddle-shaped seat disposed above the engine, and front and rear wheels mounted on front and rear regions on opposite sides of the vehicle frame. Specifically, left and right steps are disposed between the front and rear wheels and below the saddle-shaped seat.

2. Description of Background Art

Step structures for vehicles are known from (1) Japanese Patent laid-open No. Hei 11-165679 entitled "FOOT BOARD FOR SADDLE-TYPE OFF-ROAD VEHICLE AND ITS ATTACHMENT STRUCTURE" and (2) Japanese Patent laid-open No. Hei 11-11371 entitled "FOOT BOARD ATTACHMENT STRUCTURE FOR OFF-ROAD VEHICLE", for example.

According to the step structure disclosed in the publication (1), as shown in FIGS. 1 and 3 of the publication, a reinforcement member 2 is integrally mounted on a channel-shaped foot board support frame 1 on a vehicle frame F. Furthermore, foot board 10 is mounted on the foot board support frame 1 and the reinforcement member 2.

According to the step structure disclosed in the publication (2), as shown in FIGS. 1 and 19 of the publication, support brackets 101, 102 are removably mounted on an under pipe 15b of a vehicle frame 2. Furthermore, a board body 103 is mounted on the support brackets 101, 102.

With the foot board for saddle-type off-road vehicle and its attachment structure disclosed in publication (1), the weight of the vehicle is large because the reinforcement member 2 is integrally mounted on the foot board support frame 1 on a vehicle frame F. The foot board 10 is mounted on the foot board support frame 1 and the reinforcement member 2.

With the foot board attachment structure for off-road vehicle disclosed in the publication (2), the two support brackets 101, 102 are located in a position where the load from the feet of the rider is applied. Accordingly, the support brackets 101, 102 are required to be rigid, and may possibly be plastically deformed when a load from the ground is applied, for example. As with the publication (1), the weight of the vehicle is large.

SUMMARY OF THE INVENTION

It is an object of the present invention to provide a step structure for a vehicle which is capable of reducing the weight of the vehicle and which is flexible.

To achieve the above object, according to a first aspect of the present invention, a step structure is provided in a vehicle having an engine mounted centrally in a vehicle frame, a seat disposed above the engine and front and rear wheels mounted on front and rear regions on opposite sides of the vehicle frame. Left and right steps are disposed between the front and rear wheels and below the seat. Each of the steps includes a support member extending from the vehicle frame, a first wire rod frame extending from the distal end of the support member to the vehicle frame, a second wire rod frame suspending the first frame from the vehicle frame, and a foot board placed over the first frame and the support member.

The support member extends from the vehicle frame, the first wire rod frame extends from the distal end of the support member to the vehicle frame, the second wire rod frame suspends the first frame from the vehicle frame, and the foot board is placed over the first frame and the support member.

The single support member extends from the vehicle frame, the first frame is connected to the vehicle frame and the support member, the first frame is suspended by the second frame, and the foot board is placed over the first frame and the support member. Since applied loads are distributed to these members, the step structure is of high flexibility.

According to a second aspect of the present invention, the first frame is fastened to the support member and the vehicle frame at a position higher than the lower end of the vehicle frame, and the second frame is fastened to the first frame and the vehicle frame at a position higher than the lower end of the vehicle frame.

The first frame is fastened to the support member and the vehicle frame at a position higher than the lower end of the vehicle frame, and the second frame is fastened to the first frame and the vehicle frame at a position higher than the lower end of the vehicle frame. Accordingly, the frame structure has a large height from the ground.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described below with reference to the accompanying drawings. The terms "front", "rear", "left", "right", "upper", and "lower" are used to refer to directions as viewed from the perspective of the rider of the vehicle. In addition, Fr represents a front side, Rr a rear side, L a left side, and R a right side of the vehicle from the perspective of the rider. The drawings should be viewed in the direction in which the reference characters are oriented.

Figure 1:
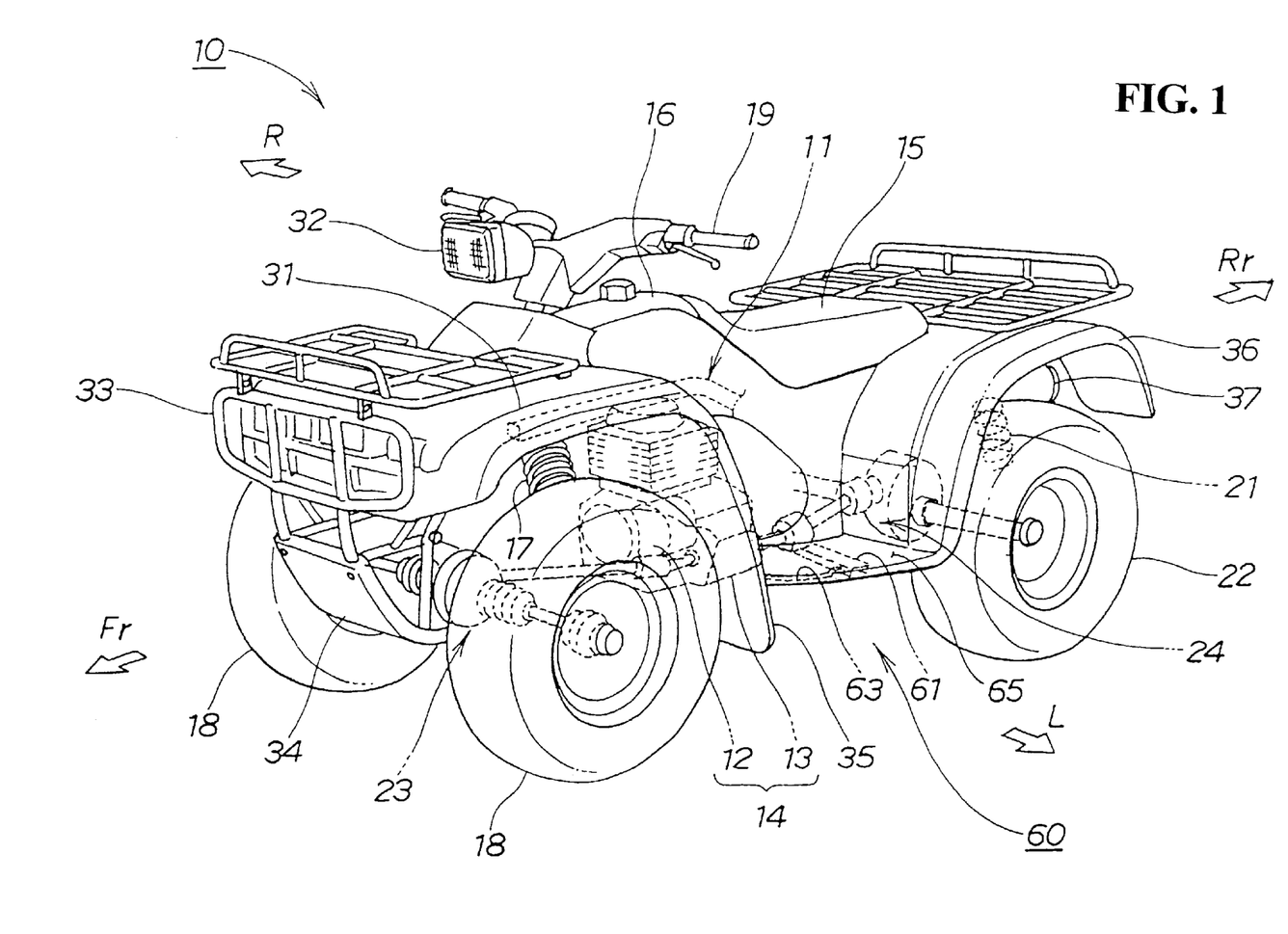
FIG. 1 is a perspective view of a vehicle incorporating a step structure according to the present invention.

FIG. 1 is a perspective view of a vehicle incorporating a step structure according to the present invention. A saddle-type vehicle 10 includes, as its main components, a vehicle frame 11 and a power unit 14. The power unit 14 includes an engine 12 and a transmission 13 which are mounted centrally on the vehicle frame 11. A saddle-shaped seat 15 is disposed above the power unit 14. A fuel tank 16 is disposed forwardly of the saddle-shaped seat 15. Front wheels 18, 18 are rotatably mounted on front sides of the vehicle frame 11 by respective left and right suspension mechanisms 17, 17 (the suspension 17 on the remote side is not shown). A steering handle 19 is provided for steering the front wheels 18, 18. Rear wheels 22, 22 (the rear wheel 22 on the remote side is not shown) are rotatably mounted on rear sides of the vehicle frame 11 by respective left and right suspension mechanisms 21, 21 (the suspension 21 on the remote side is not shown). A front power transmitting mechanism 23 is provided for transmitting rotation of the engine 12 to the front wheels 18, 18. Furthermore, a rear power transmitting mechanism 24 is provided for transmitting rotation of the engine 12 to the rear wheels 22, 22.

The reference numeral 31 represents a front fender, 32 a head lamp, 33 a front bumper, 34 an undercover, 35 a mud guard, 36 a rear fender, 37 a muffler, and 60 a step incorporating the step structure according to the present invention. The step 60 is of a structure which is lightweight and flexible.

The saddle-type vehicle 10 is a four-wheel-drive buggy, and is classified as an ATV (All Terrain Vehicle). The saddle-type vehicle 10 is lightweight and compact. Accordingly, the saddle-type vehicle can be driven to make small turns, controlled with ease, and used as a dedicated off-road vehicle suitable for movement in agricultural, stock-farming, hunting, safety surveillance, leisure and other applications.

Figure 2:
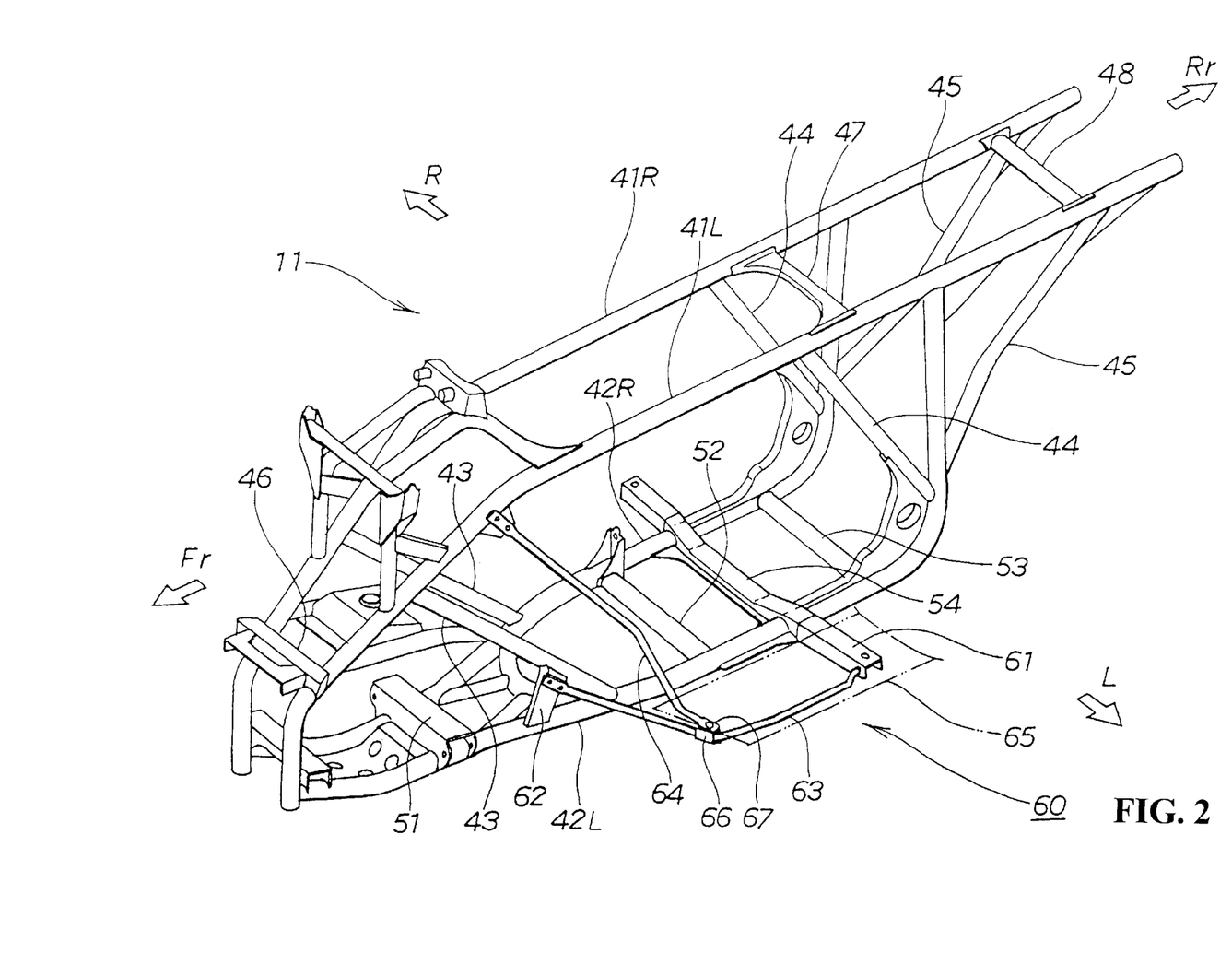
FIG. 2 is a perspective view of the vehicle frame of the vehicle incorporating the step structure according to the present invention.

FIG. 2 is a perspective view of the vehicle frame of the vehicle incorporating the step structure according to the present invention. The vehicle frame 11 mainly includes left and right upper tubes 41L, 41R, left and right down tubes 42L, 42R connected respectively to the upper tubes 41L, 41R. A front stay 43, a central stay 44, and a rear stay 45 extend between the left upper tube 41L and the left down tube 42L. A front stay 43, a central stay 44, and a rear stay 45 extend between the right upper tube 41R and the right down tube 42R. A front cross member 46, a central cross member 47, and a rear cross member 48 extend between the left and right upper tubes 41L, 41R. A front cross member 51, a central cross member 52, and a rear cross member 53 extend between the left and right down tubes 42L, 42R. Furthermore, a step attachment stay 54 extends between the left and right down tubes 42L, 42R.

The step 60 which incorporates the step structure according to the present invention is constructed laterally of a lower portion of the vehicle frame 11, and includes a support member 61 extending from the down tube 42L of the vehicle frame 11. A first frame 63 extends from the distal end of the support member 61 to a bracket 62 on the down tube 42L. A second frame 64 is suspended from the upper tube 41L to an intermediate portion of the first frame 63. A foot board 65 is disposed over the first frame 63 and the support member 61.

The first and second frames 63, 64 are constructed of wire rods. The second frame 64 is fixed to an engaging member 66 mounted on the intermediate portion of the first frame 63 by a bolt 67.

Figure 3:
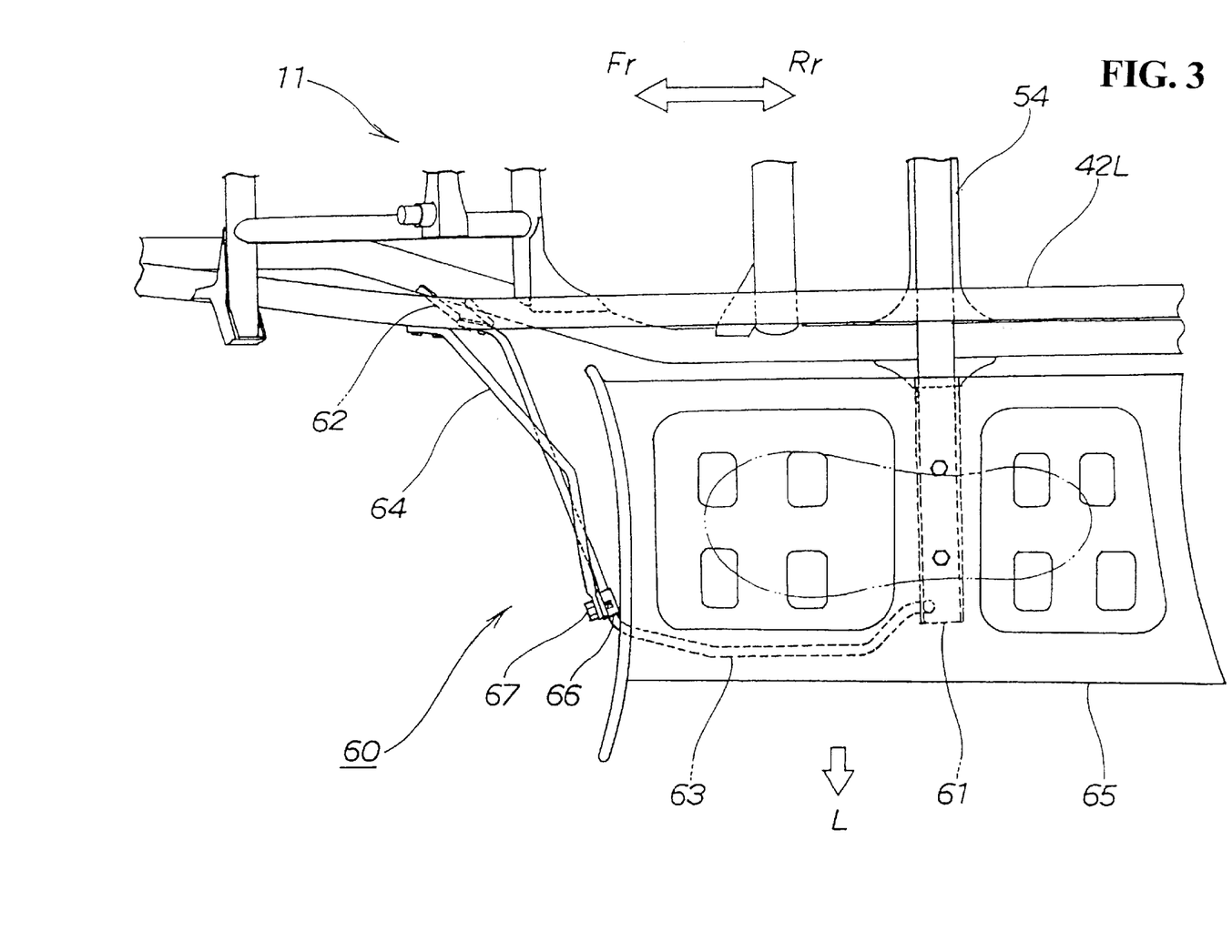
FIG. 3 is a plan view of the step structure according to the present invention.

FIG. 3 is a plan view of the step structure according to the present invention. The step structure is used in the vehicle 10 (see FIG. 1), which has the engine 12 (see FIG. 1) mounted centrally in the vehicle frame 11, the seat 15 (see FIG. 1) disposed above the engine 12, and the front and rear wheels 18, 22 mounted on front and rear regions on opposite sides of the vehicle frame 11. The left and right steps 60, 60 are disposed between the front and rear wheels 18, 22 and below the seat 15. Each of the steps 60 includes the support member 61 extending from the vehicle frame 11, the first wire rod frame 63 extending from the distal end of the support member 61 to the vehicle frame 11, and the second wire rod frame 64 suspending the first frame 63 from the vehicle frame 11. The foot board 65 is placed over the first frame 63 and the support member 61.

Specifically, the support member 61 extends from the vehicle frame 11, the first wire rod frame 63 extends from the distal end of the support member 61 to the vehicle frame 11, and the second wire rod frame 64 suspends the first frame 63 from the vehicle frame 11. The foot board 65 is placed over the first frame 63 and the support member 61.

The single support member 61 extends from the vehicle frame 11. The first frame 63 is connected to the vehicle frame 11 and the support member 61. The first frame 63 is suspended by the second frame 64. Furthermore, the foot board 65 is placed over the first frame 63 and the support member 61. Since applied loads are distributed to these members, the step structure is of high flexibility. As a result, the step is capable of flexibly handling loads applied from the ground, and is prevented from being plastically deformed by loads applied from the ground.

The first and second frames 63, 64 are made of wire rods. Accordingly, the step structure is made lightweight. As a consequence, the vehicle is made lightweight.

Figure 4:
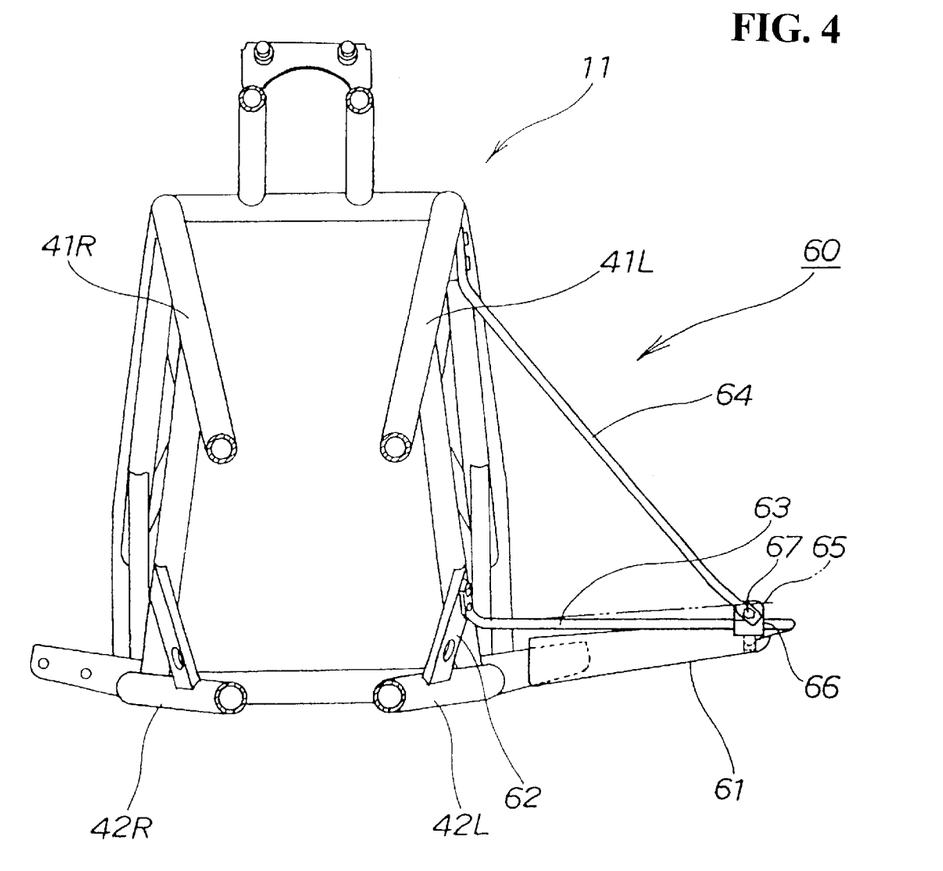
FIG. 4 is a front elevational view of the step structure according to the present invention.

FIG. 4 is a front elevational view of the step structure according to the present invention. In the step structure, the first frame 63 engages the support member 61 at a position higher than the lower end of the vehicle frame 11 and is fastened to the vehicle frame 11. The second frame 64 is fastened to the first frame 63 and the vehicle frame 11 at a position higher than the lower end of the vehicle frame 11.

Specifically, the first frame is fastened to the support member 61 and the vehicle frame 11 at a position higher than the lower end of the vehicle frame 11. The second frame 64 is fastened to the first frame 63 and the vehicle frame 11 at a position higher than the lower end of the vehicle frame 11. Accordingly, the frame structure has a large height from the ground.

Figure 5A:
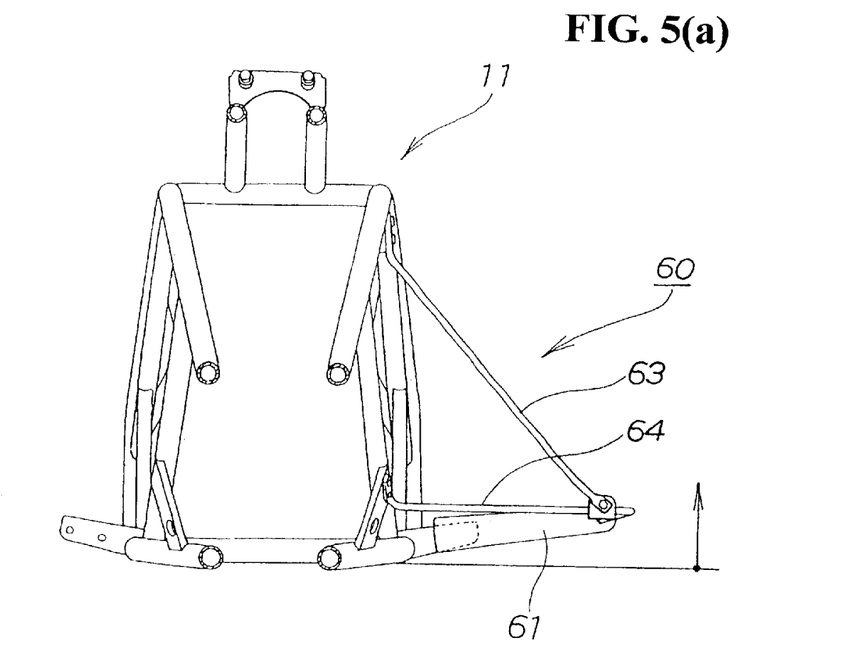
FIGS. 5(a) and 5(b) are views illustrative of the manner in which the step structure according to the present invention operates.
Figure 5B:
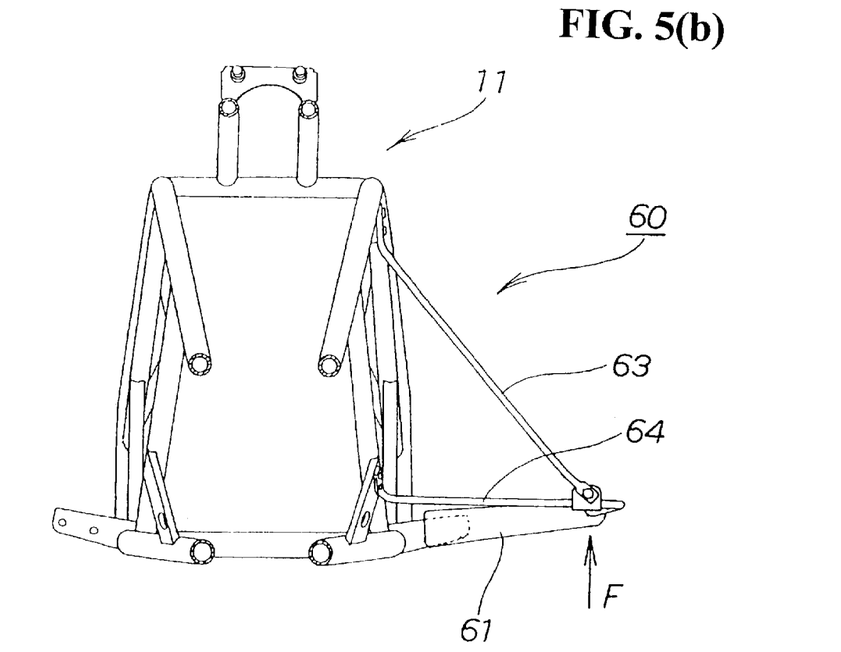

The operation of the step structure according to the present invention will now be described below. FIGS. 5(a) and 5(b) are illustrative of the manner in which the step structure according to the present invention operates.

FIG. 5(a) shows that the support member 61 and the first and second frames 63, 64 are disposed above the vehicle frame 11. As a result, obstacles are prevented from hitting the step 60.

In FIG. 5(b), when a load F is applied from the ground to the step 60, the load is distributed to and absorbed by the support member 61 and the first and second frames 63, 64. Therefore, the step 60 is prevented from being plastically deformed. Thus, the step structure is of high flexibility.

Figure 6:
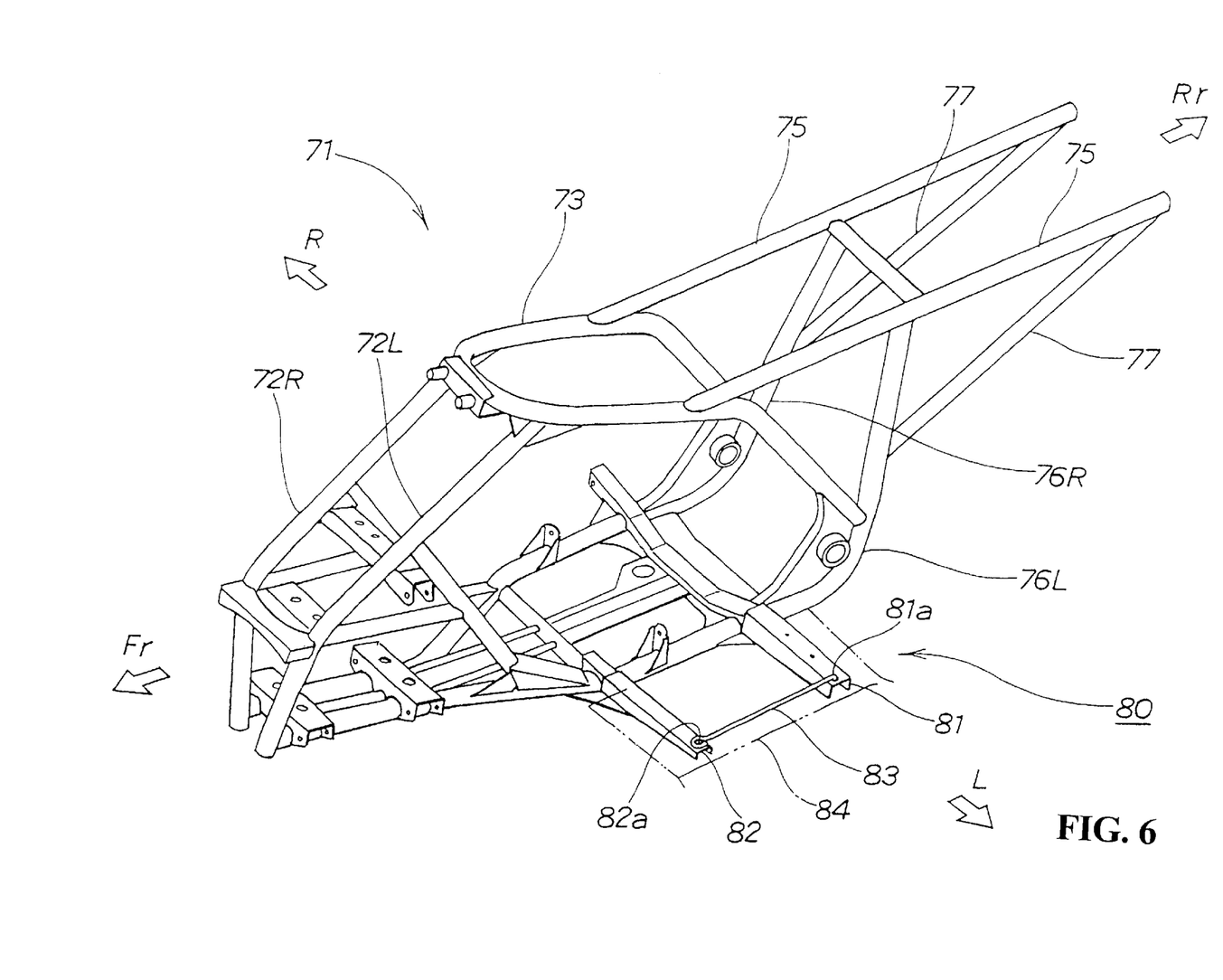
FIG. 6 is a perspective view of the vehicle frame of a vehicle which incorporates a step structure according to a second embodiment of the present invention.

FIG. 6 is a perspective view of the vehicle frame of a vehicle which incorporates a step structure according to a second embodiment of the present invention.

In FIG. 6, the reference numeral 71 identifies a vehicle frame. Reference numerals 72L, 72R are left and right upper tubes of the vehicle frame 71. Reference numeral 73 is a main tube of the vehicle frame 71. Reference numerals 75, 75 are rear tubes of the vehicle frame 71. Reference numerals 76L, 76R are left and right down tubes of the vehicle frame 71. Furthermore, reference numerals 77, 77 are rear stays. A step 80 of the step structure according to the second embodiment includes first and second support members 81, 82 mounted on the down tube 76L. A wire rod frame 83 extends between the distal ends of the support members 81, 82. A foot board 84 is disposed over the frame 83 and the first and second support members 81, 82.

The frame 83 has an end engaging in a hole 81a formed in the first support member 81 and an opposite end engaging in a hole 82a formed in the second support member 82. The frame 83 is thus removably mounted on the first and second support members 81, 82. The step can therefore be assembled with increased ease.

Figure 7:
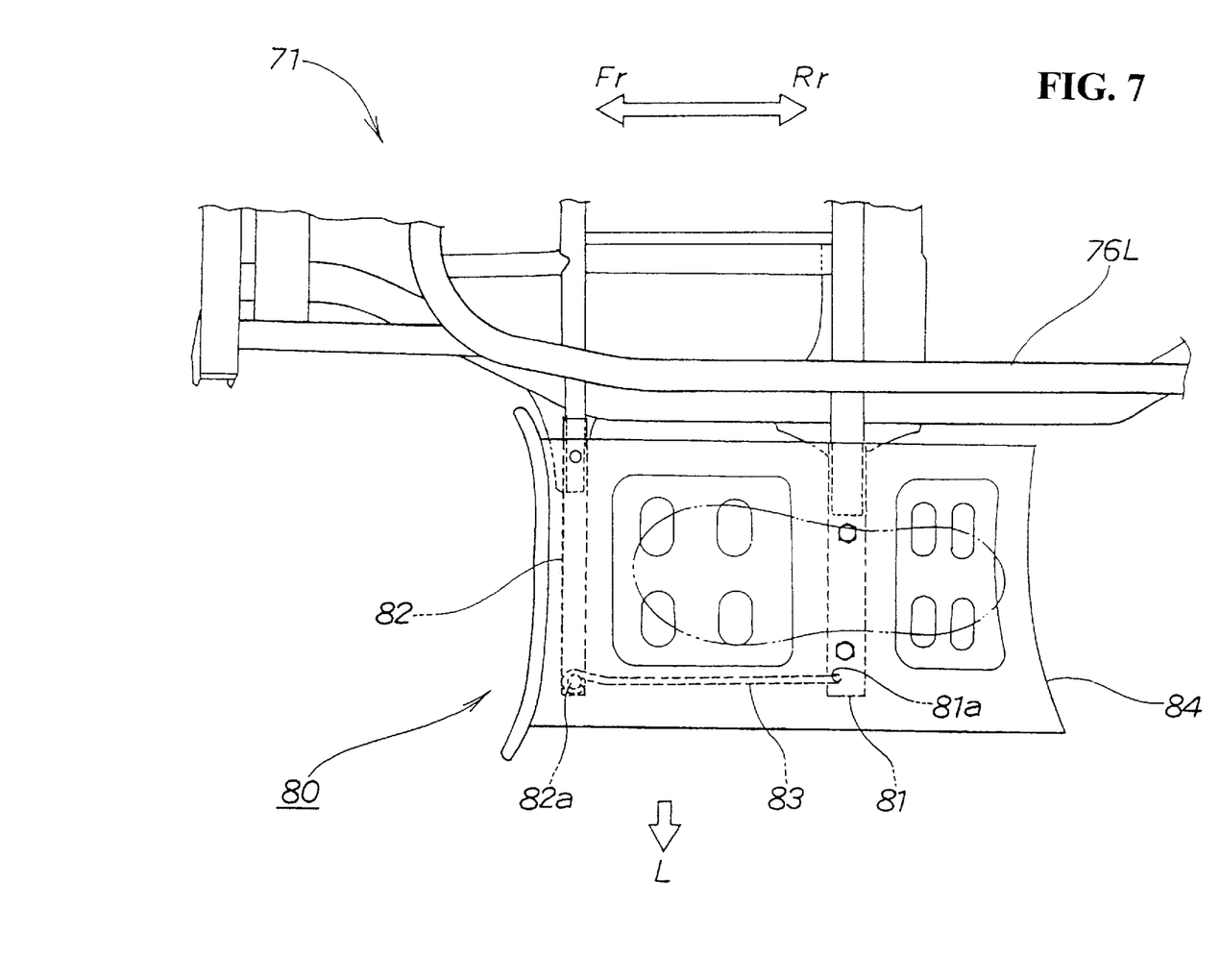
FIG. 7 is a plan view of the step structure according to the second embodiment of the present invention.

FIG. 7 is a plan view of the step structure according to the second embodiment of the present invention. The step structure according to the second embodiment is used in the vehicle 10 (see FIG. 1), which has the engine 12 (see FIG. 1) mounted centrally in the vehicle frame 71, the seat 15 (see FIG. 1) disposed above the engine 12, and the front and rear wheels 18, 22 mounted on front and rear regions on opposite sides of the vehicle frame 71. Left and right steps 80 are disposed between the front and rear wheels 18, 22 and below the seat 15. Each of the steps 80 includes the first and second support members 81, 82 extending from the vehicle frame 71. The wire rod frame 83 extends between the distal ends of the support members 81, 82. The foot board 84 is disposed over the frame 83 and the first and second support members 81, 82.

Figure 8:
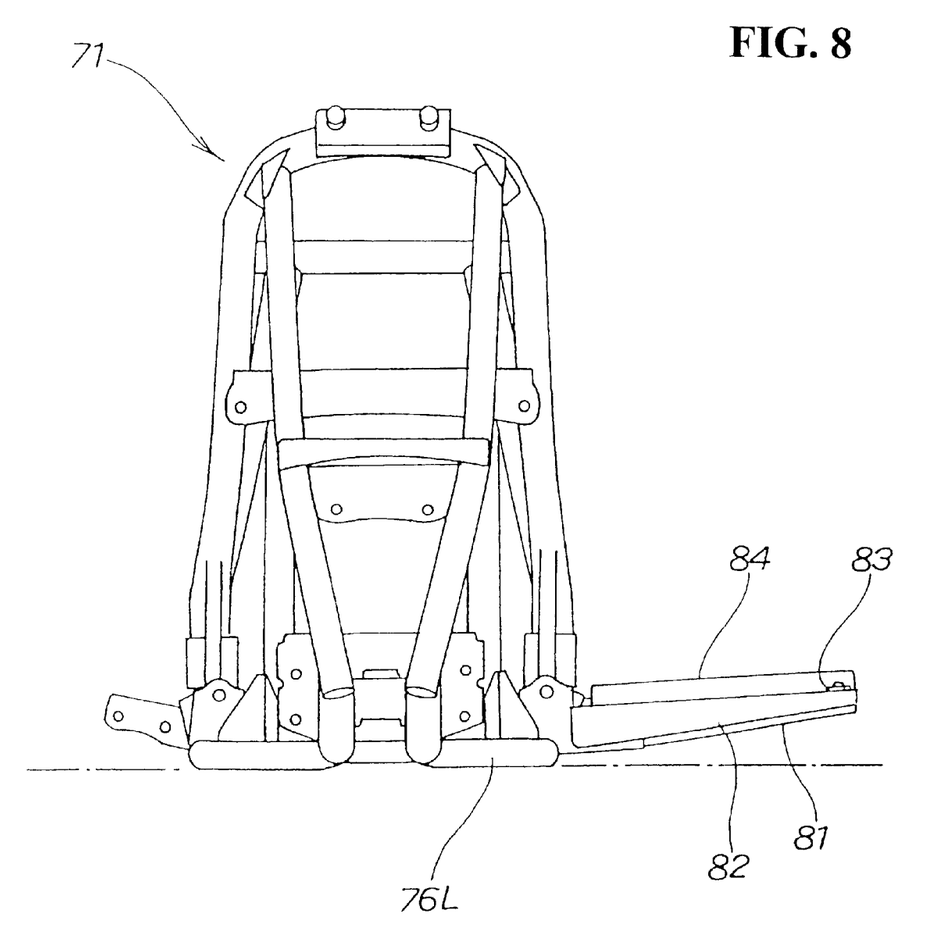
FIG. 8 is a front elevational view of the step structure according to the second embodiment of the present invention.

FIG. 8 is a front elevational view of the step structure according to the second embodiment of the present invention. The first and second support members 81, 82 extend from the vehicle frame 71. The wire rod frame 83 extends between the distal ends of the support members 81, 82. The foot board 84 is disposed over the frame 83 and the first and second support members 81, 82. The step structure is of high flexibility. As a result, the step is capable of flexibly handling loads applied from the ground, and is prevented from being plastically deformed by loads applied from the ground.

The frame 83 is made of a wire rod. Accordingly, the step structure is made lightweight, and hence the vehicle is made lightweight.

The step 60 on the left side of the vehicle has been described in the embodiments as shown in FIG. 3. However, the step structure on the right side of the vehicle has a step 60 which is symmetrical with respect to the center of the vehicle.

The present invention thus constructed offers the following advantages:

According to the first aspect of the present invention, the step includes a support member extending from a vehicle frame. A first wire rod frame extends from the distal end of the support member to the vehicle frame. A second wire rod frame suspends the first frame from the vehicle frame. A foot board is placed over the first frame and the support member. Since applied loads are distributed to these members, the step structure is of high flexibility. As a result, the step is capable of flexibly handling loads applied from the ground, and is prevented from being plastically deformed by loads applied from the ground.

The first and second frames are made of wire rods. Accordingly, the step structure is made lightweight, and hence the vehicle is made lightweight.

According to the second aspect of the present invention, the first frame is fastened to the support member and the vehicle frame at a position higher than the lower end of the vehicle frame. The second frame is fastened to the first frame and the vehicle frame at a position higher than the lower end of the vehicle frame. Therefore, the frame structure has a large height from the ground, with the result that obstacles are prevented from hitting the step.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A step structure in a vehicle, the vehicle having an engine mounted centrally in a vehicle frame, a seat disposed above the engine, and front and rear wheels mounted on front and rear regions on opposite sides of the vehicle frame, said step structure comprising:
   left and right steps, said left and right steps being disposed between the front and rear wheels and below the seat, each of said steps comprising:
      a support member, said support member extending from the vehicle frame;
      a first wire rod frame, said first wire rod frame extending from a distal end of said support member to the vehicle frame;
      a second wire rod frame, said second wire rod frame suspending the first frame from the vehicle frame; and
      a foot board, said foot board being placed over said first frame and said support member.

2. The step structure in a vehicle according to claim 1, wherein said first frame is fastened to said support member and said vehicle frame at a position higher than a lower end of the vehicle frame, and said second frame is fastened to said first frame and the vehicle frame at a position higher than the lower end of the vehicle frame.

3. The step structure in a vehicle according to claim 2, wherein said second frame is fixed to an engaging member mounted on an intermediate portion of said first frame by a bolt.

4. The step structure in a vehicle according to claim 2, wherein said first frame includes a first portion extending generally parallel to a longitudinal direction of the vehicle frame and a second portion extending generally obliquely toward the vehicle frame, said first and second portions being separated from each other at an intermediate portion of said first frame by a bend.

5. The step structure in a vehicle according to claim 4, wherein said first and second portions are located generally in a same horizontal plane.

6. The step structure in a vehicle according to claim 5, wherein said second frame extends generally obliquely upwardly from said intermediate portion to the vehicle frame.

7. The step structure in a vehicle according to claim 1, wherein said second frame is fixed to an engaging member mounted on an intermediate portion of said first frame by a bolt.

8. The step structure in a vehicle according to claim 1, wherein said first frame includes a first portion extending generally parallel to a longitudinal direction of the vehicle frame and a second portion extending generally obliquely toward the vehicle frame, said first and second portions being separated from each other at an intermediate portion of said first frame by a bend.

9. The step structure in a vehicle according to claim 8, wherein said first and second portions are located generally in a same horizontal plane.

10. The step structure in a vehicle according to claim 9, wherein said second frame extends generally obliquely upwardly from said intermediate portion to the vehicle frame.

11. A step structure in a vehicle, the vehicle having an engine mounted centrally in a vehicle frame, a seat disposed above the engine, and front and rear wheels mounted on front and rear regions on opposite sides of the vehicle frame, said step structure comprising:
    left and right steps, said left and right steps being disposed between the front and rear wheels and below the seat, each of said steps comprising:
        a first member, said first member extending from the vehicle frame;
        a second member, said second member extending from the vehicle frame;
        a wire rod frame, said wire rod frame extending from a distal end of said first member to a distal end of said second member; and
        a foot board, said foot board being placed over said first member, said second member and said wire rod frame.

12. The step structure in a vehicle according to claim 11, wherein said wire rod frame is fastened to said first member and said second member at a position higher than a lower end of the vehicle frame.

13. The step structure in a vehicle according to claim 12, wherein said wire rod frame extends between said first member and said second member in a generally horizontal plane.

14. The step structure in a vehicle according to claim 11, wherein said wire rod frame extends between said first member and said second member in a generally horizontal plane.

15. The step structure in a vehicle according to claim 11, wherein said wire rod frame includes a first end engaging in a hole formed in the first member and a second, opposite end engaging in a hole formed in said second member.

16. The step structure in a vehicle according to claim 11, wherein said wire rod frame and said second member are formed from a first wire rod frame, each of said left and right steps further comprising:
    a second wire rod frame, said second wire rod frame suspending the first frame from the vehicle frame.

17. The step structure in a vehicle according to claim 16, wherein said first frame is fastened to said first member and said vehicle frame at a position higher than a lower end of the vehicle frame, and said second frame is fastened to said first frame and the vehicle frame at a position higher than the lower end of the vehicle frame.

18. The step structure in a vehicle according to claim 17, wherein said second frame is fixed to an engaging member mounted on an intermediate portion of said first frame by a bolt.

19. The step structure in a vehicle according to claim 16, wherein said second frame is fixed to an engaging member mounted on an intermediate portion of said first frame by a bolt.

* * * * *